3,478,150
3 - OXYGENATED - 5 - OXYMETHYL-5α-ANDROSTENE DERIVATIVES AND PREPARATION THEREOF
Masayuki Narisada, Kyoto Prefecture, Japan, assignor to Shionogi & Co., Ltd., Osaka, Japan
No Drawing. Filed July 19, 1965, Ser. No. 473,181
Claims priority, application Japan, July 22, 1964, 39/41,866
Int. Cl. A61k 17/06; C07c 169/22, 169/14
U.S. Cl. 424—241                    18 Claims

ABSTRACT OF THE DISCLOSURE

5 - oxymethyl-3-oxo-5α-androst-9(11)-ene derivatives, including 5α,3α-intramolecular hemiketal derivatives, which may be prepared by metal-ammonia reduction of the thiolactones of 5α-carboxy-9α-mercapto-5α-androstane products, and suitable further conversions, are gonadotropin secretion promoting agents.

---

This invention relates to novel 5-substituted steroids, especially of the androstene series and to the preparation thereof.

The object compounds of the present invention are represented by the following general formula:

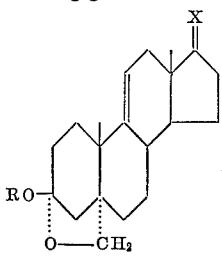

(A)

or

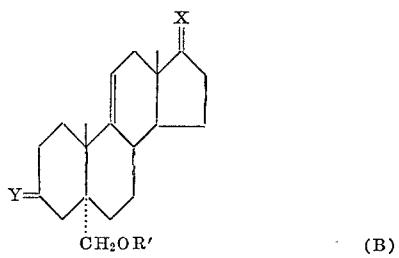

(B)

wherein R is a hydrogen atom, a lower alkyl group, a lower alkanoyl group, a 2- or 3-hydroxy-lower alkyl group or a 2- or 3-lower alkanoyloxy-lower alkyl group, R' is a hydrogen atom or a lower alkanoyl group, X is an oxo group or a ketal group and Y is an oxo group or a ketal group, exhibit remarkable hormonal activities, especially promoting of gonadotropin secretion.

The object of the present invention is to provide the above defined novel compounds. Another object of the present invention is to provide the preparing method therefor. Another object is to provide pharmacologically active new remedies. Another object is to embody effective hormones, especially of promoting gonadotropin secretion. The other objects of this invention will be apparent to a man skilled in the art, according to the following disclosures.

The lower alkyl groups comprised in R are, for instance, methyl, ethyl, propyl, isopropyl, butyl, tert.-butyl, pentyl groups. The lower alkanoyl groups comprised in R are, for instance, formyl, acetyl, propionyl, butyryl, pentanoyl, trimethylacetyl groups. The 2- and 3-hydroxy-lower alkyl groups and 2- and 3-lower alkanoyl-oxy-lower alkyl groups in R are embodied by 2-hydroxyethyl, 2-formyloxyethyl, 2-acetyloxyethyl, 2-hydroxypropyl, 2-acetyloxybutyl, 1-methyl-2-hydroxypropyl, 2-propionyloxypentyl, 2-pentanoyloxyethyl, 3-hydroxypropyl, 3-acetyloxypropyl, 3 - hydroxypentyl, 3-butyryloxy-1-methylbutyl groups. As the lower alkanoyl group comprised in R', the same groups illustrated above in R can be equally used. In the ketal group in the above definition X, the 1,2- and 1,3-lower alkylene groups are embodied by the illustration: ethylene, propylene, trimethylene, 1,3-pentylene, 2,3-butylene, etc. The lower alkyl groups in X are as defined above for R. As the β-hydroxy-α-lower alkyl moiety, a grouping such as β-hydroxy-α-methyl, β-hydroxy-α-ethyl, β-hydroxy-α-propyl, β-hydroxy-α-butyl, β-hydroxy-α-isopropyl, β-hydroxy-α-isobutyl, β-hydroxy-α-tert.-butyl, β-hydroxy-α-pentyl can be applied. Examples of the ketal group mentioned above bearing one 1,2- or 1,3-lower alkylene group or two lower alkyl groups, in Y, are same as in the illustration for X.

The compounds of the present invention exhibit remarkable hormonal activities, especially promoting of gonadotropin secretion and, therefore, they are effective for controlling insufficiency or irregularity of pituitary gonadotropin secretion, which usually cause hypogonadism such as sexual immaturity, anovulation, amenorrhea, etc. For instance, 3β-hydroxy-3α,5α-epoxymethano-5α-androst-9(11)-en-17-one and 17α-methyl-3α,5α-epoxymethano-5α-androst-9(11)-ene-3β,17β-diol exhibit respectively about −34% to −37% inhibition (e.g. promotion) of gonadotropin secretion at total dose each 1 mg. per one parabiont of mice (subcutaneously, 10 consecutive days).

Among the compounds of this invention, compounds being representable by the following generic formula:

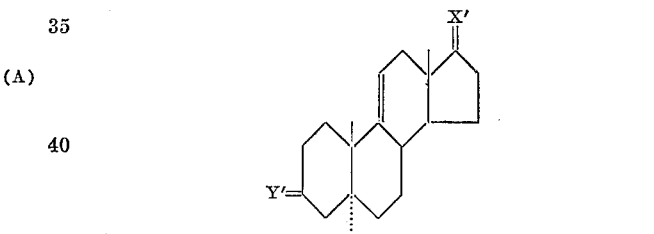

(C)

or

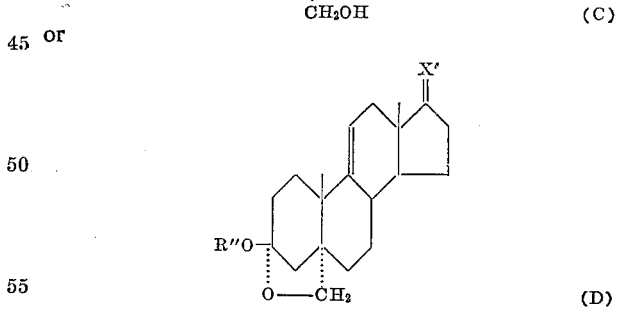

(D)

wherein X' is a ketal group or a β-hydroxy-α-lower alkyl moiety, Y' is a ketal group and R" is a lower alkyl group or a 2- or 3-hydroxy-lower alkyl group, are prepared by reducing the corresponding starting material represented by the formula:

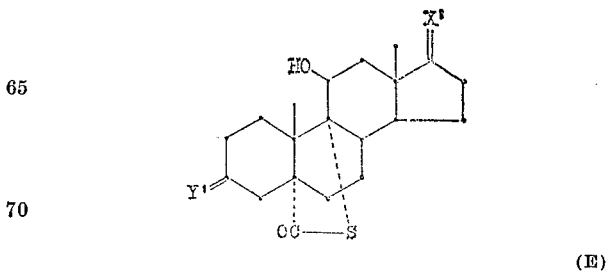

(E)

wherein X' and Y' are same as defined, with a metal belonging to I and II group in the periodic system, especially lithium, potassium, sodium, calcium, in liquid ammonia, whereby the presence of a proton donor such as alcohol, water, other amines lead the reaction to yield mainly or predominantly type-C and the absence thereof lead the reaction to yield mainly or predominantly type-D products. The reduction is generally carried out at temperatures lower than the boiling point of ammonia within a short time such as a few minutes to a few hours, whereby co-solvent such as ether, tetrahydrofuran, etc. is usually applicable. The starting material E can be prepared, according to the method disclosed in Japanese patent publication No. 5,678/63, by the conventional ketalation techniques.

The compounds being representable by the following general formula:

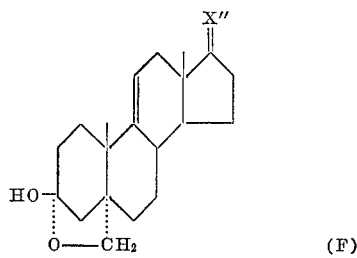

wherein X" is an oxo group or a β-hydroxy-α-lower alkyl moiety, are prepared from the above C or D by the action of an aqueous acid. The acid treatment can be carried out by heating or allowing to stand at low temperature such as room temperature in an acid. In this reaction, when an alcoholic solvent is used, the product F bears the corresponding alkyl ether group at C–3β; thus simultaneous etherification occurs. The compound F can be converted to the isomer represented by the following formula:

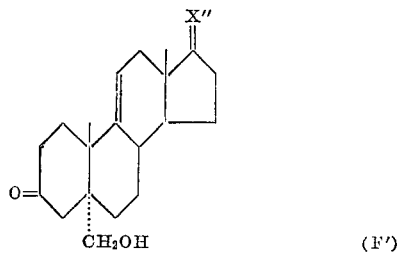

wherein X" is as defined above, the action of heat and conversely it returns to F by recrystallization.

The etherification or acylation of free hydroxyls in the products, 3β-hydroxy or 3β-hydroxy-lower alkoxy in A or 5α-hydroxymethyl in B, can be accomplished by the action of the corresponding lower alkanol, lower alkanoyl anhydride or lower ankanoyl halide in conventional manner, wherein the reaction in the presence of acid catalyst results in formation of the product type-A and the reaction in the presence of base catalyst results in formation of the product type-B.

The conversion of 3β-(lower alkoxy)-3α,5α-epoxymethano-5α-androst-9(11)-en-17-one to 3β-(lower alkoxy)-17α-(lower alkyl)-3α,5α-epoxymethano-5α-androst-9(11)-en-17β-ol can be accomplished by reaction with the corresponding lower alkylmetal compound, the metal being positioned in I to II group in the periodic system such as lithium, magnesium, zinc or cadmium. The reaction may be preferably carried out at a temperature range from 0° C. to boiling point of the solvent used in an inert solvent for not more than 10 hours. As the typical alkylmetal compound, methyllithium, methylmagnesium bromide, methylmagnesium iodide, ethyllithium, butyllithium, dipropylzinc, dibutylcadmium and pentylmagnesium bromide can be illustrated.

The compounds of the invention are used in human or veterinary medicine solely or in combination or in preparations in conjunction with a solid or liquid pharmaceutical excipient. The preparations are prepared by per se known methods, for example with the use of pharmaceutical organic or inorganic excipients suitable for enteral or parenteral administration. Suitable excipients are substances that do not react with the products of the invention such, for instance, as water, vegetable oils, benzyl alcohols, polyethylene glycols, gelatine, lactose, starches, magnesium stearate, talc, white petroleum jelly, isopropyl myristate or other known pharmaceutical excipients. There are especially made preparations for parenteral administration, preferably solutions, above all oily or aqueous solutions, furthermore suspensions, emulsions or implants; for enteral administration there are similarly also made tablets or dragees, and for local administration also ointments or creams. If desired, auxiliaries may be added thereto, such as preserving, stabilising, wetting or emulsifying agents, salt for regulating the osmotic pressure, or buffers. They may also contain other therapeutically useful substances. The preparations are obtained in the customary way. The content of active compound in these preparations, such as of an ampoule, is preferably 100γ to 200 mg., or 100 p.p.m. to 50%.

The following examples illustrate the invention.

EXAMPLE I

Preparation of 3,3;17,17 - bisethylenedioxy-9α-mercapto-11β-hydroxy-5α-androstane-5-carboxylic acid 5,9-thiolactone 3,17 - dioxo-9α-mercapto-11β-hydroxy-5α-androstane-5-carboxylic acid 5,9-thiolactone (Japanese patent publication No. 5,678/63) (2.391 g.) is added to a mixture of ethylene glycol (250 ml.) and p-toluenesulfonic acid monohydrate (70 mg.), and the resultant mixture is heated at 72–77° C. under reduced pressure (4 mm. Hg). During the heating period (about 3 hours) the reaction mixture is concentrated to about 70 ml. After cooling, the reaction mixture is alkalinified with ethanolic potassium hydroxide solution and then poured into about 2 liters of ice-water. The crystals thereby formed are collected by filtration and then dissolved into dichloromethane. The solution is, after washed with water, concentrated and then diluted with hexane, thereby 2.719 g. (yield: 91%) of crystalline 3,3;17,17-bisethylenedioxy-9α-mercapto-11β-hydroxy-5α-androstane-5-carboxylic acid 5,9-thiolactone, M.P. >320° C. (with decomposition) is obtained.

$[\alpha]_D^{30}$ +28.6° (c.=0.510%, in chloroform).

Analysis.—Calcd. for $C_{24}H_{34}O_6S$: C, 63.97; H, 7.59; S, 7.12. Found: C, 63.76; H, 7.60; S, 7.32.

UV: $\lambda_{max.}^{ethanol}$ 240 mμ (ε 3880). IR: $\nu_{max.}^{Nujol}$ 3510 (OH), 1668 (CO) cm.$^{-1}$.

EXAMPLE II

Preparation of 3,3;17,17-bisethylenedioxy-5α-androst-9(11)-ene-5-methanol

One gram of 3,3;17,17-bisethylenedioxy-9α-mercapto-11β-hydroxy-5α-androstane-5-carboxylic acid 5,9-thiolactone is dissolved in 140 ml. of tetrahydrofuran and the resultant solution is admixed with 300 ml. of liquid ammonia. To the mixture, after addition of 1 ml. of water, there are added 496 mg. of lithium metal under vigorous stirring and refluxing. After 40 minutes reaction, ammonia is removed and the residue is poured into 1.4 liters of ice-water, which is further added with 140 g. of sodium chloride and extracted with ether. The extract is washed with sodium chloride solution, dried with anhydrous sodium sulfate and distilled to leave crude crystalline product, which is recrystallized from acetone to afford narrow plates of 3,3;17,17-bisethylenedioxy-5α-androst-9(11)-ene-5-methanol, M.P. 197–204° C. (652 mg., yield: 73%).

$[\alpha]_D^{16}$ —56.0° (c.=0.511%, in chloroform).

*Analysis.*—Calcd. for $C_{24}H_{36}O_5$: C, 71.25; H, 8.97. Found: C, 71.44; H, 8.97.

UV: $\lambda_{max.}^{ethanol}$ 206 m$\mu$ ($\epsilon$ 3630). IR: $\nu_{max.}^{CCl_4}$ 3612 cm.$^{-1}$; $\nu_{max.}^{Nujol}$ 3584, 3558 (OH); 3026, 1638, 825 (—CH=C<) cm.$^{-1}$.

EXAMPLE III

Preparation of 3,3;17,17-bisethylenedioxy-5α-androst-9(11)-ene-5-methanol acetate 3,3;17,17 - bisethylenedioxy - 5α - androst - 9(11) - ene-5-methanol is acetylated with acetic anhydride-pyridine complex in the usual manner, thereby corresponding monoacetate, M.P. 149–151° C. is obtained (yield: 86%).

$[\alpha]_D^{21}$ —30.9° (c.=0.498% in chloroform).

*Analysis.*—Calcd. for $C_{26}H_{38}O_6$: C, 69.92; H, 8.58. Found: C, 70.18; H, 8.54.

UV: $\lambda_{max.}^{ethanol}$ 206 m$\mu$ ($\epsilon$ 3160). IR: $\nu_{max.}^{Nujol}$ 1736, 1266, 1245 (OAc); 3036, 1643, 826 (—CH=C<) cm.$^{-1}$.

EXAMPLE IV

Preparation of 5α-acetyloxymethyl-5α-androst-9(11)ene-3,17-dione 3,3;17,17 - bisethylenedioxy - 5α - androst - 9(11) - ene-5-methanol acetate (20 mg.) is heated in 1 ml. of 75% acetic acid at 100° C. for 30 minutes and then concentrated by distillation under reduced pressure. The distillation residue is added to water, neutralized with aqueous sodium carbonate solution and extracted with chloroform. The extract is evaporated and resultant crude crystals (17 mg.) are recrystallized from acetone-hexane mixture, thereby 14 mg. of 5α-acetyloxymethyl-5α-androst - 9(11) - ene-3,17-dione, M.P. 166–169° C. is obtained.

$[\alpha]_D^{29}$ +101.9° (c.=1.042%, in chloroform).

*Analysis.*—Calcd. for $C_{22}H_{30}O_4$: C, 73.71; H, 8.44. Found: C, 73.86; H, 8.42.

UV: $\lambda_{max.}^{ethanol}$ 205 m$\mu$ ($\epsilon$ 3140). IR: $\nu_{max.}^{Nujol}$ 1739 (17-CO and acetyl-CO); 1234 (OAc); 1707 (3-CO); 3039, 1639, 825 (—CH=C<) cm.$^{-1}$; $\nu_{max.}^{CS_2}$ 1747, 1714, 1227 cm.$^{-1}$.

EXAMPLE V

Preparation of 3β-hydroxy-3α,5α-epoxymethano-5α-androst-9(11)-en-17-one

One hundred milli-grams of 3,3;17,17-bisethylenedioxy-5α-androst-9(11)-ene-5-methanol is dissolved in 5 ml. of 75% aqueous acetic acid and the resulting mixture is heated on a water bath for 30 minutes and then distilled off under reduced pressure. The residue is admixed with 5 ml. of water and the resulting crystals are collected by filtration and, after washed with water, recrystallized from acetone, thereby 65 mg. (yield; 83%) of 3β-hydroxy-3α,5α-epoxymethano-5α-androst-9(11)-en-17-one, M.P. 214–218° C. is obtained.

$[\alpha]_D^{21}$ +111° (c.=0.473%, in chloroform).

*Analysis.*—Calcd. for $C_{20}H_{28}O_3$: C, 75.93; H, 8.92. Found: C, 75.68; H, 8.89.

UV: $\lambda_{max.}^{ethanol}$ 206 m$\mu$ ($\epsilon$ 3190). IR: $\nu_{max.}^{CCl_4}$ 3610, 1744 cm.$^{-1}$; $\nu_{max.}^{Nujol}$ 3500 (OH); 1725 (CO) 3038, 1632, 823 (—CH=C<) cm.$^{-1}$.

EXAMPLE VI

Preparation of 5α-acetyloxymethyl-5α-androst-9(11)-ene-oxy-3α,5α-epoxymethano-5α-androst-9(11)-ene and 3β-(2 - hydroxyethoxy) - 17α - methyl - 3α,5α - epoxymethano-5α-androst-9(11)-en-17β-ol One gram of 3,3;17,17-bisethylenedioxy-9α-mercapto-11β-hydroxy-5α-androstane-5-carboxylic acid 5,9-thiolactone is dissolved in 130 ml. of tetrahydrofuran and the resultant solution is added dropwisely into 200 ml. of liquid ammonia. By removal of cooling jacket, the temperature of the reaction mixture is maintained at b.p. of ammonia. Lithium metal (700 ml.) is then added to the boiling mixture little by little and, after stirring for 30 minutes, the mixture is evaporated. The resulting residue is poured into 1.3 liters of ice-water, which is saturated with sodium chloride and then extracted with chloroform. The extract is washed with water, dried with anhydrous sodium sulfate and evaporated under reduced pressure. Thus obtained product (835 mg.) is chromatographed over 30 g. of alumina. Eluate of benzene-ether mixture (3:1)(468 mg.) affords 345 mg. (yield: 39%) of 3β-(2-hydroxyethoxy) - 17,17 - ethylenedioxy - 3α,5α - epoxymethano-5α-androst-9(11)-ene, M.P. 149–153° C. (recrystallized from acetone-hexane mixture).

$[\alpha]_D^{18}$ —5.6° (c.=0.958%, in chloroform).

*Analysis.*—Calcd. for $C_{24}H_{36}O_5$: C, 71.25; H, 8.97. Found: C, 71.35; H, 8.92.

UV: $\lambda_{max.}^{ethanol}$ 206 m$\mu$ ($\epsilon$ 3540). IR: $\nu_{max.}^{CCl_4}$ 3609, 3509 cm.$^{-1}$; $\nu_{max.}^{Nujol}$ 3498 (OH); 3034, 1633, 825 (—CH=C<) cm.$^{-1}$.

In the similar manner, 3β-(2-hydroxyethoxy)-17α-methyl - 3α-5α - epoxymethano - 5α - androst - 9(11) - en-17β-ol is obtained from 3,3-ethylenedioxy-9α-mercapto-11β,17β - dihydroxy - 17α - methyl - 5α - androstane - 5-carboxylic acid 5,9-thiolactone.

EXAMPLE VII

Preparation of 3β-(2-acetyloxyethoxy)-17,17-ethylenedioxy-3α,5α-epoxymethano-5α-androst-9(11)-ene One hundred milli-grams of 3β-(2-hydroxyethoxy)-17,17 - ethylenedioxy - 3α,5α - epoxymethano - 5α - androst-9(11)-ene is acetylated with acetic anhydride-pyridine complex in an usual manner to afford 101 mg. of the corresponding monoacetate, M.P. 136–137° C.

$[\alpha]_D^{26}$ —3.8° (c.=1.075%, in chloroform).

*Analysis.*—Calcd. for $C_{26}H_{38}O_6$: C, 69.92; H, 8.58. Found: C, 70.24; H, 8.64.

UV: $\lambda_{max.}^{ethanol}$ 206 m$\mu$ ($\epsilon$ 3680). IR: $\nu_{max.}^{Nujol}$ 1741, 1238, 1225 (OAc); 3036, 1634, 825 (—C=CH<) cm.$^{-1}$.

EXAMPLE VIII

Preparation of 3β-hydroxy-3α,5α-epoxymethano-5α-androst-9(11)-en-17-one and 17α-methyl-3α,5α-epoxymethano-5α-androst-9(11)-ene-3β,17β-diol 3β-(2-hydroxyethoxy) - 17,17 - ethylenedioxy-3α,5α-epoxymethano-5α-androst-9(11)-ene (85 mg.) is heated in 6 ml. of 75% aqueous acetic acid solution for 30 minutes on a water bath and then evaporated under reduced pressure. The resultant residue is admixed with water and crystals thereby formed are collected by filtration. On recrystallization from acetone 51 mg. (yield: 77%) of 3β-hydroxy - 3α,5α - epoxymethano-5α-androst-9(11)-en-17-one, M.P. 216–218° C. is obtained.

In the similar manner, 17α-methyl-3α,5α-epoxymethano 5α-androst-9(11)-ene-3β,17β-diol is obtained from 3β-(2 - hydroxyethoxy)-17α-methyl-3α,5α-epoxymethano-5α-androst-9(11)-en-17β-ol.

EXAMPLE IX

Preparation of 3β-acetyloxy-3α,5α-epoxymethano-5α- androst-9(11)-en-17-one and 5α-acetyloxymethyl-5α-androst-9(11)-ene-3,17-dione One hundred milli-grams of 3β-hydroxy-3α,5α-epoxymethano-5α-androst-9(11)-en-17-one are dissolved in 5 ml. of acetic anhydride. The mixture is, after addition of 30 mg. of p-toluenesulfonic acid monohydrate, allowed to stand at room temperature for 24 hours. The reaction mixture is poured into ice-water, which is neutralized with aqueous sodium carbonate solution and then extracted with chloroform. The extract is treated as usual and the resulting crude product (114 mg.) is chromatographed on 4 g. of neutral alumina. Eluate of petroleum ether-benzene mixture (2:1) (40 mg.) affords 19.5 mg. of narrow plates of 3β-acetyloxy-3α,5α-epoxymethano- 5α-androst-9(11)-en-17-one, M.P. 112–115° C. (recrystallized from acetone-hexane mixture) (yield: 17%).

$[α]_D^{30}$+89.6° (c.=0.682%, in chloroform).

Analysis.—Calcd. for $C_{22}H_{30}O_4 \cdot 1/2H_2O$: C 71.90, H 8.23. Found: C 72.28, H 8.29.

IR: $ν_{max.}^{Nujol}$ 1747 (shoulder), 1738 (CO); 3037, 1634, 833, 823 (—CH=C<) cm.$^{-1}$.

Further eluates of the solvent systems from petroleum ether-benzene (1:1) to benzene-chloroform (1:9) are combined (63.7 mg.) and recrystallized from acetone-hexane mixture, thereby 37 mg. (yield: 33%) of 5α-acetyloxymethyl-5α-androst-9(11)-ene-3,17-dione, M.P. 165–169° C. is obtained.

EXAMPLE X

Preparation of 3β-methoxy-3α,5α-epoxymethano-5α-androst-9(11)-en-17-one and 3β-methoxy-17α-methyl-3α,5α-epoxymethano-5α-androst-9(11)-ene-17β-ol 3β-hydroxy - 3α,5α - epoxymethano-5α-androst-9(11)-en-17-one (200 mg.) is dissolved into 16 ml. of 10% methanolic hydrogen chloride solution and the resultant solution is allowed to stand 24 hours at room temperature. The mixture is concentrated to the volume 5 ml. at below 30° C. under reduced pressure. The concentrate is admixed with chloroform and then poured into ice-cooled aqueous sodium carbonate solution. The chloroform layer is collected, washed with water, dried and evaporated under reduced pressure to afford 210 mg. of crystalline product, which affords 185 mg. of 3β-methoxy - 3α,5α - epoxymethano - 5α - androst-9(11)-en-17-one, M.P. 177.5–179° C. (from acetone-hexane mixture) (yield: 89%).

$[α]_D^{29}$+136.1° (c.=1.072%, in chloroform).

Analysis.—Calcd. for $C_{21}H_{30}O_3$: C 76.32, H 9.15. Found: C 76.68, H 9.27.

UV: $λ_{max.}^{ethanol}$ 206 mμ (ε 3360). IR: $ν_{max.}^{Nujol}$ 1746 (17-CO); 3046, 1634, 827, 821 (—CH=C<) cm.$^{-1}$; $ν_{max.}^{CCl_4}$ 1747 cm.$^{-1}$.

In the similar manner, 3β-methoxy-17α-methyl-3α,5α-epoxymethano-5α-androst-9(11)-en-17β-ol is obtained from 17α - methyl-3α,5α-epoxymethano-5α-androst-9(11) ene-3β,17β-diol.

EXAMPLE XI

Preparation of 3β-methoxy - 17α - methyl-3α,5α-epoxymethano-5α-androst-9(11)-en-17β-ol To an ethereal methylmagnesium iodide solution prepared from 134 mg. of magnesium metal and 0.850 g. of methyl iodide, 200 mg. of 3β-methoxy-3α,5α-epoxymethano-5α-androst-9(11)-en-17-one in 40 ml. of benzene is added. The mixture is refluxed for 5 hours and then the ether is distilled off. The resulting benzene solution is refluxed for 2 hours with stirring. After destroying the excess amount of the reagent remaining unchanged with ice, the mixture is extracted with chloroform. The extract affords 157 mg. of 3β-methoxy-17α-methyl-3α,5α-epoxymethano-5α-androst-9(11)-en-17β-ol, M.P. 154–157/162–163° C. (double melting points) (purified with chromatography followed by recrystallization from acetone-hexane mixture).

$[α]_D^{30}$+1° (c.=1.090, in chloroform).

Analysis.—Calcd. for $C_{22}H_{34}O_3$: C 76.26, H 9.89. Found: C 76.46, H 9.90.

IR: $ν_{max.}^{Nujol}$ 3400 (OH) cm.$^{-1}$.

EXAMPLE XII

Preparation of 17α-methyl-3α,5α-epoxymethano-5α-androst-9(11)-ene-3β,17β-diol and 17α-methyl-17β-hydroxy-3-oxo-5α-androst-9(11)-ene-5-methanol A solution of 3β-methoxy-17α-methyl-3α,5α-epoxymethano-5α-androst-9(11)-en-17β-ol (100 mg.) in 5 ml. of 75% aqueous acetic acid solution is heated for 30 minutes on a steam bath. The mixture is concentrated under reduced pressure and the resulting residue is extracted with chloroform. Recrystallization of the chloroform residue from acetone-hexane affords needles (84 mg.) of 17α - methyl-3α,5α-epoxymethano-5α-androst-9(11)-ene-3β,17β-diol, M.P. 142–145/188–192° C. (double melting points).

Analysis.—Calcd. for $C_{21}H_{32}O_3 \cdot 1/3H_2O$ (dried at 60–70° C., 2 mm. Hg): C 74.49, H 9.72. Found: C 74.45, H 9.91.

IR: $ν_{max.}^{Nujol}$ 3346 (OH) cm.$^{-1}$ (no carbonyl band).

Heating at 130–140° C. for 6 hours 17α-methyl-3α,5α-epoxymethano-5α-androst-9(11)-ene-3β,17β - diol transforms into prismatic crystals of 17α-methyl-17β-hydroxy-3-oxo-5α-androst-9(11)-ene-5-methanol, M.P. 204–207° C.

$[α]_D^{27}$−16° (c.=1.143%, in chloroform).

Analysis.—Calcd. for $C_{21}H_{32}O_3$: C 75.86, H 9.70. Found: C 76.22, H 9.81.

IR: $ν_{max.}^{Nujol}$ 3495 (OH), 1697 (3-CO) cm.$^{-1}$.

Recrystallization of 17α-methyl-17β-hydroxy-3-oxo-5α-androst-9(11)-ene-5-methanol from acetone-hexane mixture affords 17α-methyl-3α,5α-epoxymethano-5α-androst-9(11)-ene-3β,17β-diol. Infrared spectra of the two substances in chloroform are the same and show a weak carbonyl band at 1708 cm.$^{-1}$.

I claim:

1. 3β - hydroxy - 3α,5α - epoxymethano - 5α - androst-9(11)-en-17-one.

2. 3β - acetyloxy - 3α,5α - epoxymethano - 5α - androst-9(11)-en-17-one.

3. 3β - (2 - hydroxyethoxy) - 17,17 - ethylenedioxy-3α,5α-epoxy-methano-5α-androst-9(11)-ene.

4. 3β - (2 - acetyloxyethoxy) - 17,17 - ethylenedioxy-3α,5α-epoxymethano-5α-androst-9(11)-ene.

5. 17α - methyl - 3α,5α - epoxymethano - 5α - androst-9(11)-ene-3β,17β-diol.

6. A compound of the formula:

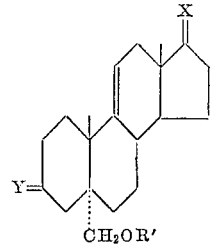

wherein R′ is a hydrogen atom or a lower alkanoyl group, X is an oxo group, a ketal group or a β-hydroxy-α-lower alkyl moiety and Y is an oxo group or a ketal group.

7. 3,3;17,17 - bisethylenedioxy - 5α - androst - 9(11)-ene-5-methanol.

8. 3,3;17,17 - bisethylenedioxy - 5α - androst - 9(11)-ene-5-methanol acetate.

9. 5α - acetyloxymethyl - 5α - androst - 9(11) - ene-3,17-dione.

10. 17α-methyl - 17β - hydroxy - 3 - oxo - 5α - androst-9(11)-ene-5-methanol.

11. 3,3;17,17 - bisethyenedioxy - 9α - mercapto - 11β-hydroxy-5α-androstane-5-carboxylic acid 5,9-thiolactone.

12. A process for preparing a compound of the formula:

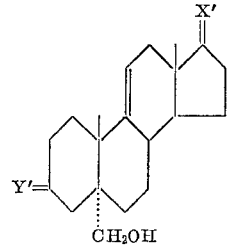

or the formula:

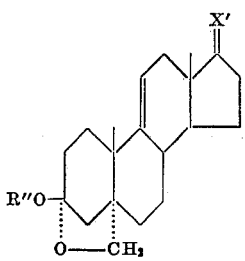

wherein X′ is a ketal group or a β-hydroxy-α-lower alkyl moiety, Y′ is a ketal group and R″ is a lower alkyl group or a 2- or 3-hydroxy-lower alkyl group, which comprises reducing a compound of the formula:

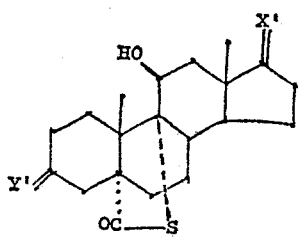

wherein X′ and Y′ are as defined above, with a metal belonging to group I or group II of the periodic system in liquid ammonia.

13. A process claimed in claim 12, wherein the reduction is carried out in the presence of amine, alcohol or water.

14. A process for preparing a compound of the formula:

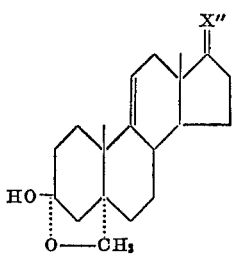

wherein X″ is an oxo group or a β-hydroxy-α-lower alkyl moiety, which comprises subjecting a compound of the formula:

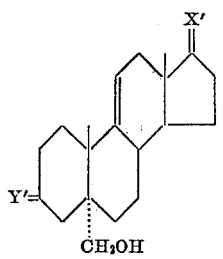

or the formula:

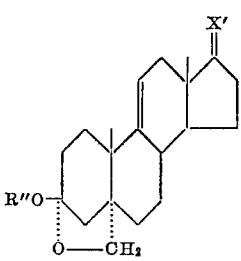

wherein X′ and Y′ are defined as in claim 12 and R″ is a lower alkyl group or a 2- or 3-hydroxy-lower alkyl group, to reaction with an aqueous lower alkanoic acid.

15. The process of claim 14 wherein the aqueous lower alkanoic acid is 75% acetic acid.

16. A process for preparing a compound of the formula:

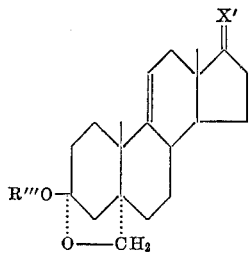

wherein R‴ is a lower alkyl group or a lower alkanoyl group and X″ is defined in claim 14, which comprises subjecting a compound of the formula:

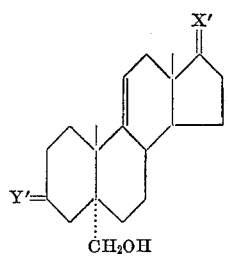

or the formula:

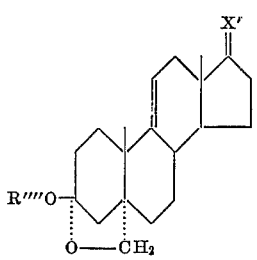

wherein X′ and Y′ are defined as in claim 12 and R‴″ is a hydrogen atom, a lower alkyl group or a 2- or 3-hydroxy-lower alkyl group, to reaction with the corresponding lower alkanol, lower alkanoyl anhydride or lower alkanoyl halide in the presence of an acid catalyst.

17. A method of human and veterinary application for promoting gonadotropin secretion which comprises enteral or parenteral administration of 100γ to 200 mg. of a compound having the formula

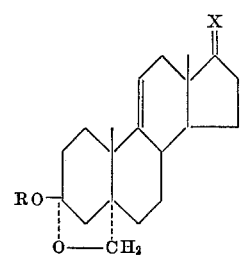

wherein R is a hydrogen atom, a lower alkyl group, a lower alkanoyl group, a 2- or 3-hydroxy-lower alkyl group or a 2- or 3-lower alkanoyloxy-lower alkyl group and X is an oxo group, a ketal group or a β-hydroxy-α-lower alkyl moiety.

18. A method of human and veterinary application for promoting gonadotropin secretion which comprises enteral or parenteral administration of 100γ to 200 mg. of a compound having the formula

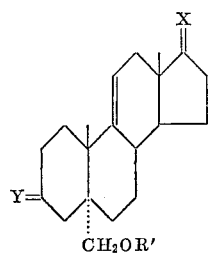

wherein R' is a hydrogen atom or a lower alkanoyl group, X is an oxo group, a ketal group or a β-hydroxy-α-lower alkyl moiety and Y is an oxo group or a ketal group.

References Cited

UNITED STATES PATENTS

| | | | |
|---|---|---|---|
| 3,299,048 | 1/1967 | Nagata et al. | 260—239.55 |
| 3,346,601 | 10/1967 | Wettstein et al. | 260—397.4 |
| 3,120,515 | 2/1964 | Christiansen | 260—239.5 |

OTHER REFERENCES

Takeda et al., Steroids,
Nagata et al., Proceedings Chem. Soc., July, 1964, pp. 241–242.

LEWIS GOTTS, Primary Examiner
ETHEL G. LOVE, Assistant Examiner

U.S. Cl. X.R.

260—239.55, 239.57, 397.45; 424—242, 243